United States Patent
Dagens et al.

(10) Patent No.: US 7,346,232 B2
(45) Date of Patent: Mar. 18, 2008

(54) COMPACT POLARIZER AND ASSOCIATED DEVICE FOR SEMICONDUCTOR DEVICES

(75) Inventors: Béatrice Dagens, Antony (FR); Guang-Hua Duan, Chatenay-Malabry (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/546,559

(22) Filed: Oct. 12, 2006

(65) Prior Publication Data

US 2007/0086692 A1 Apr. 19, 2007

(30) Foreign Application Priority Data

Oct. 14, 2005 (FR) ................................. 05 10511

(51) Int. Cl.
*G02B 6/00* (2006.01)

(52) U.S. Cl. .............................. 385/11; 385/27; 385/39

(58) Field of Classification Search .................. 385/11, 385/14, 27, 39

See application file for complete search history.

(56) References Cited

U.S. PATENT DOCUMENTS

| 6,941,032 B2* | 9/2005 | Martinelli et al. ............ 385/11 |
| 2002/0037126 A1 | 3/2002 | Martinelli et al. |
| 2004/0184129 A1 | 9/2004 | Solli |
| 2004/0258355 A1 | 12/2004 | Wang et al. |

FOREIGN PATENT DOCUMENTS

GB 2 384 319 A 7/2003

OTHER PUBLICATIONS

Flanders D C: "Submicrometer Periodicity Gratings as Artificial Anisotropic Dielectrics" Applied Physics Letters, AIP, American Institute of Physics, Melville NY vol. 42, No. 6 1983 pp. 492-494.
Sugimoto N et al: Waveguide Polarization Independent Optical Circulator IEEE Photonics Technology Letters, IEEE Service Center Piscataway NJ US vol. 11, No. 3, Mar. 1999 pp. 355-357.

* cited by examiner

*Primary Examiner*—Frank G. Font
*Assistant Examiner*—Michael P. Mooney
(74) *Attorney, Agent, or Firm*—Lowe Hauptman & Ham Berner, LLP

(57) ABSTRACT

The field of the invention is that of the semiconductor optical devices used in particular for fibre-optic telecommunications. To function efficiently, a certain number of semiconductor devices require the use of light polarized in a given polarization state. When knowledge of the polarization the state is lost, the optical element according to the invention makes it possible to polarize the light again in a known polarization state. By using two of these elements in combination with a coupler, it is possible to produce a device which fulfils the same function as a polarization splitter. This optical assembly delivers two output signals whose polarization states are the projections of the initial polarization onto two orthogonal axes. The main advantage of these devices is that they are produced using polarization rotators based on photonic crystals, and they can consequently be integrated easily into semiconductor devices, which the use of discrete polarizers does not allow.

3 Claims, 3 Drawing Sheets

COMPACT POLARIZER AND ASSOCIATED DEVICE FOR SEMICONDUCTOR DEVICES

RELATED APPLICATION

The present application is based on, and claims priority from France Application Number 0510511, filed Oct. 14, 2005, the disclosure of which is hereby incorporated by reference herein in its entirety.

BACKGROUND OF THE INVENTION

1. Field of the Invention

The field of the invention is that of the semiconductor optical devices used in particular for fibre-optic telecommunications.

A fibre-optic telecommunications device essentially comprises optoelectronic devices for optical signal generation, transduction, shaping and amplification and optical fibres for connection.

After travelling through a standard optical fibre, knowledge of the polarization the state of the initial optical signal is lost. The optoelectronic devices used for receiving this signal consequently needed to have characteristics and properties which are independent of the polarization. It is very difficult to obtain such devices with integrated components, which are generally sensitive to the polarization state. Optical amplifiers are a particular example. It is possible to use discrete components which are less sensitive to the polarization state, albeit of course to the detriment of the cost and the bulk of the system.

2. Description of the Prior Art

To overcome this drawback it is possible to use systems with polarization diversity, which separately process two orthogonal polarizations obtained by projecting the polarization of the signal onto two orthogonal axes. A polarization splitter is then used, which is currently available either in free optics or in integrate optics. In the latter case the component has dimensions of more than one millimetre, these dimensions being dictated by the components used to produce the half-wave plate needed for splitting the polarizations.

SUMMARY OF THE INVENTION

It is an object of the invention to overcome these various drawbacks by providing an integrated polarizing optical assembly which fulfils the same function as a polarization splitter. This optical assembly delivers two output signals whose polarization states are the projections of the initial polarization onto two orthogonal axes.

Based on this first optical assembly, it then becomes possible to produce more complex systems which deliver an optical signal whose polarization state and energy are independent of the polarization state of the input signal.

Polarization rotators based on photonic crystals are highly suitable for producing the devices according to the invention.

More precisely, the invention relates to a device for polarizing optical signals, characterized in that it comprises at least a first optical assembly composed of:

A polarization rotator having a polarization axis and arranged so that, from an input optical signal $S_I$ polarized linearly in a given direction $P_I$, it provides an output optical signal $S_F$ polarized linearly in a direction $P_F$ which is symmetrical to the polarization direction of the input signal with respect to the said polarization axis;

A first optical coupler of the 1×2 type having one optical input and two optical outputs;

A second optical coupler of the 2×1 type having two optical inputs and one optical output;

the polarization rotator being arranged between the first output of the first coupler and the first input of the second coupler, the second output of the first coupler being connected to the second input of the second coupler.

Advantageously, the device furthermore comprises:

a second optical assembly comprising a second rotator, a third coupler and a fourth coupler, the polarization axis of the second rotator of this optical assembly being perpendicular to that of the first rotator, the polarization rotator being arranged between the first output of the third coupler and the first input of the fourth coupler, the second output of the third coupler being connected to the second input of the fourth coupler;

A fifth optical coupler of the 1×2 type having one optical input and two optical outputs, connected respectively to the input of the first optical assembly and to the input of the second optical assembly.

Advantageously, the rotators are photonic crystals having a plurality of substantially plane and mutually parallel layers of semiconductor material, the said layers having a series of mutually parallel identical notches which are inclined with respect to the average plane of the layers.

BRIEF DESCRIPTION OF THE DRAWINGS

The invention will be understood more clearly and other advantages will become apparent on reading the following description given without implying any limitation, and with reference to the appended figures in which.

The following conventions have been adopted in the various figures:

The optical signals are represented by transparent straight arrows;

The polarization planes are represented by oriented black arrows.

MORE DETAILED DESCRIPTION

Figure 1:
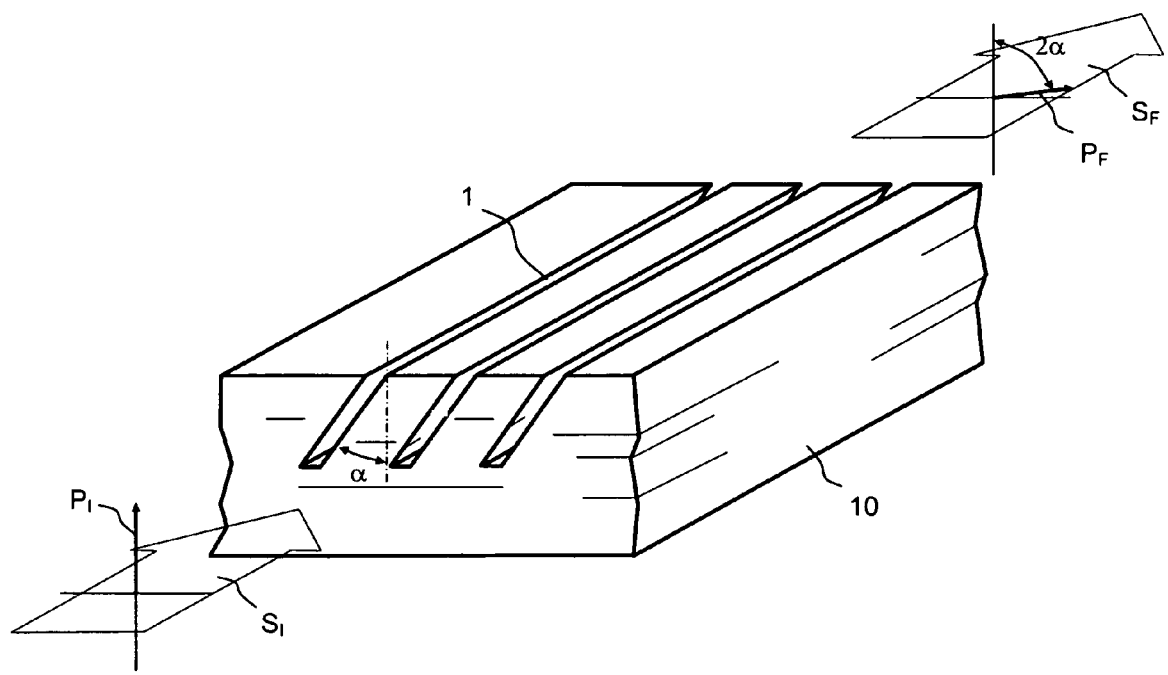
FIG. 1 represents a view of an optical rotator used in the devices according to the invention.

Integrated semiconductor devices which can be used to rotate the polarization plane of light have recently appeared. FIG. 1 represents an example of a device of this type. It essentially comprises a heterostructure 10 having a stack of substantially plane and mutually parallel layers made of semiconductor material. The optical indices of these layers are selected so as to ensure optical guiding along an axis perpendicular to the planes of the layers. The stack generally comprises one or more so-called low-index layers arranged between one or more so-called high-index layers. The materials used are typically based on InP. The layers have a series of mutually parallel identical notches 1 which are inclined with respect to the average plane of the layers. These notches may be in the form of parallel grooves as represented in FIG. 1. They may also be in the form of lines or arrays of regularly spaced holes. In the rest of the text, the average direction of the inclination of the notches will be referred to as the polarization axis. The notches generally have a depth of between one and a few microns, a length of a few microns and a width of a few tens of nanometres. They are separated by a few hundreds of nanometres and their number varies between a few notches and a few tens of notches. The inclination of the notches is typically 45 degrees.

It can be shown that the two polarization states of an optical signal, respectively parallel and perpendicular to the average plane of the notches, propagate with different velocities. As a function of the length of the heterostructure, it is thus possible to obtain a known phase shift between the two polarization states. As indicated in FIG. 1, if the parameters of the notches and the heterostructure are suitably selected as a function of the wavelength of the optical signals used, in order to obtain a phase shift of π between the two propagation modes, the polarization plane of a light wave $S_I$ polarized linearly in the direction $P_I$ which makes an angle α with the average plane of the notches consequently rotates through an angle 2α after travelling through the heterostructure. The signal $S_F$ polarized linearly in the direction $P_F$ is thus obtained. The function fulfilled is equivalent to that obtained with a conventional half-wave plate.

This type of rotator is highly suitable for producing the polarizing optical assemblies according to the invention.

Figure 2:
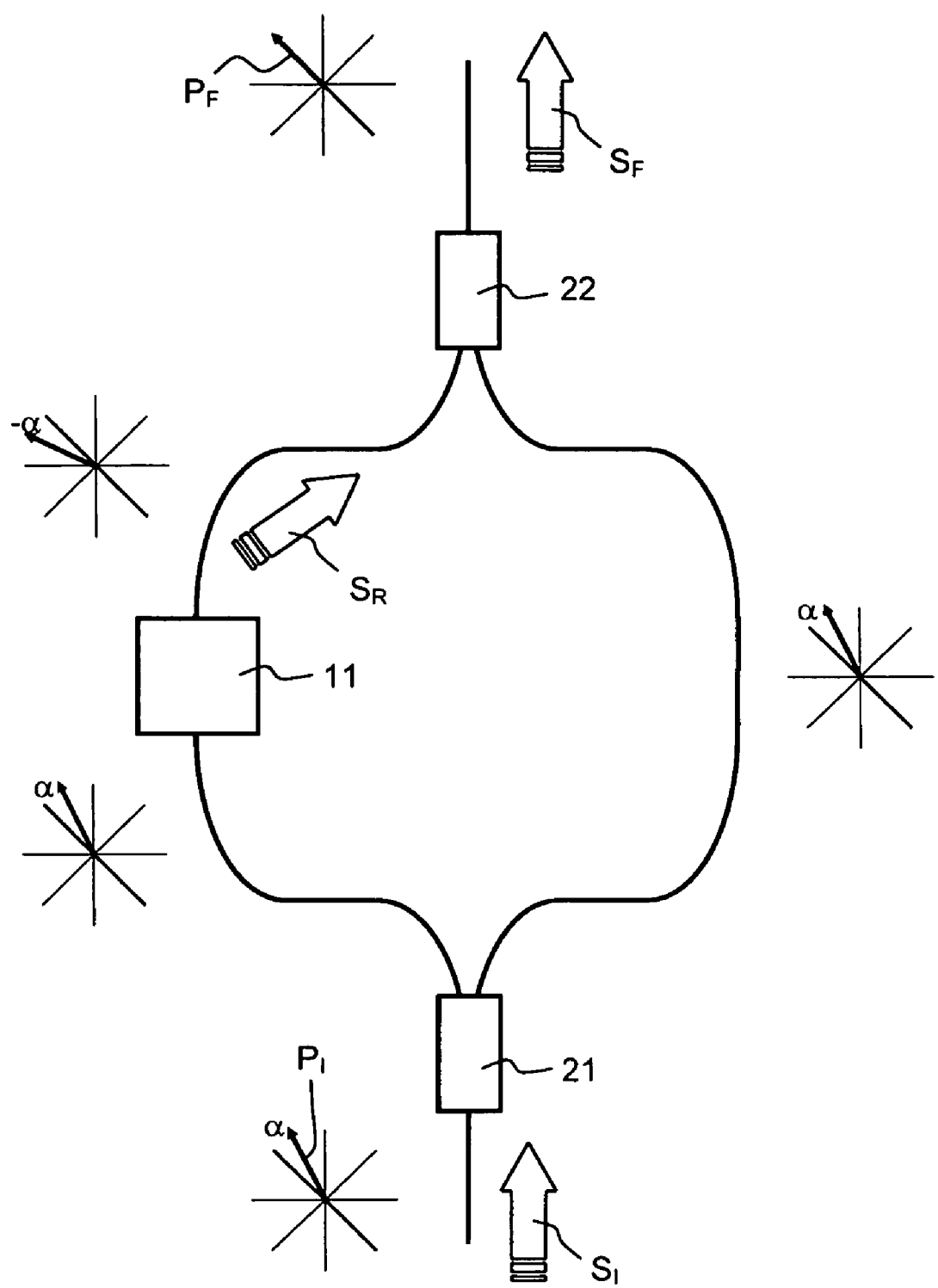
FIG. 2 represents the block diagram of a polarizer according to the invention.

A first assembly is described in FIG. 2. It comprises:

a polarization rotator 11 having a polarization axis and arranged so that, from an input optical signal $S_I$ polarized linearly in a given direction $P_I$, it provides an output optical signal $S_F$ polarized linearly in a direction $P_F$ which is symmetrical to the polarization direction of the input signal with respect to the said polarization axis;

A first optical coupler 21 of the 1×2 type having one optical input and two optical outputs;

A second optical coupler 22 of the 2×1 type having two optical inputs and one optical output;

the polarization rotator 11 being arranged between the first output of the first coupler 21 and the first input of the second coupler 22, the second output of the first coupler 21 being connected to the second input of the second coupler.

The optical assembly functions in the following way. Let there be a polarized optical signal $S_I$ whose polarization state makes an angle α with the polarization axis of the rotator 11. The first coupler 21 splits this signal $S_I$ into two signals of substantially equal intensity and the same polarization. One of these signals travels through the rotator. At the output of the rotator 11, the polarization plane of this signal has rotated and now makes an angle −α with the polarization axis of the rotator 11. The second coupler 22 combines this signal $S_R$ with that part of the signal coming from the first coupler 21 which has not travelled through the rotator. At the output of the second coupler 22, the polarization plane of the output signal $S_F$ thus necessarily has the same direction as the polarization axis of the rotator. It is polarization is therefore known. If the intensity of the input signal is equal to $I_O$, then, assuming all the optical components to be perfect, the intensity of the output signal is equal to $I_O \cdot \cos^2\alpha$.

The conventional Malus law of simple polarizers is indeed obtained. The main advantage of this assembly is that it comprises only components which can be integrated easily into semiconductor devices.

The couplers are preferably produced using integrated waveguides. To minimize the optical losses in the couplers, it is necessary to avoid using waveguides with excessively small radii of curvature for connecting the various optical elements, which slightly increases the total length of the optical assembly. Typically, the total length of a polarizer of this type remains less than 100 microns.

Based on this primary assembly, it is of course possible to produce any types of devices which use polarizers. As a nonlimiting example, FIG. 3 illustrates a device which can be used for splitting the orthogonal projections of the input signal.

Figure 3:
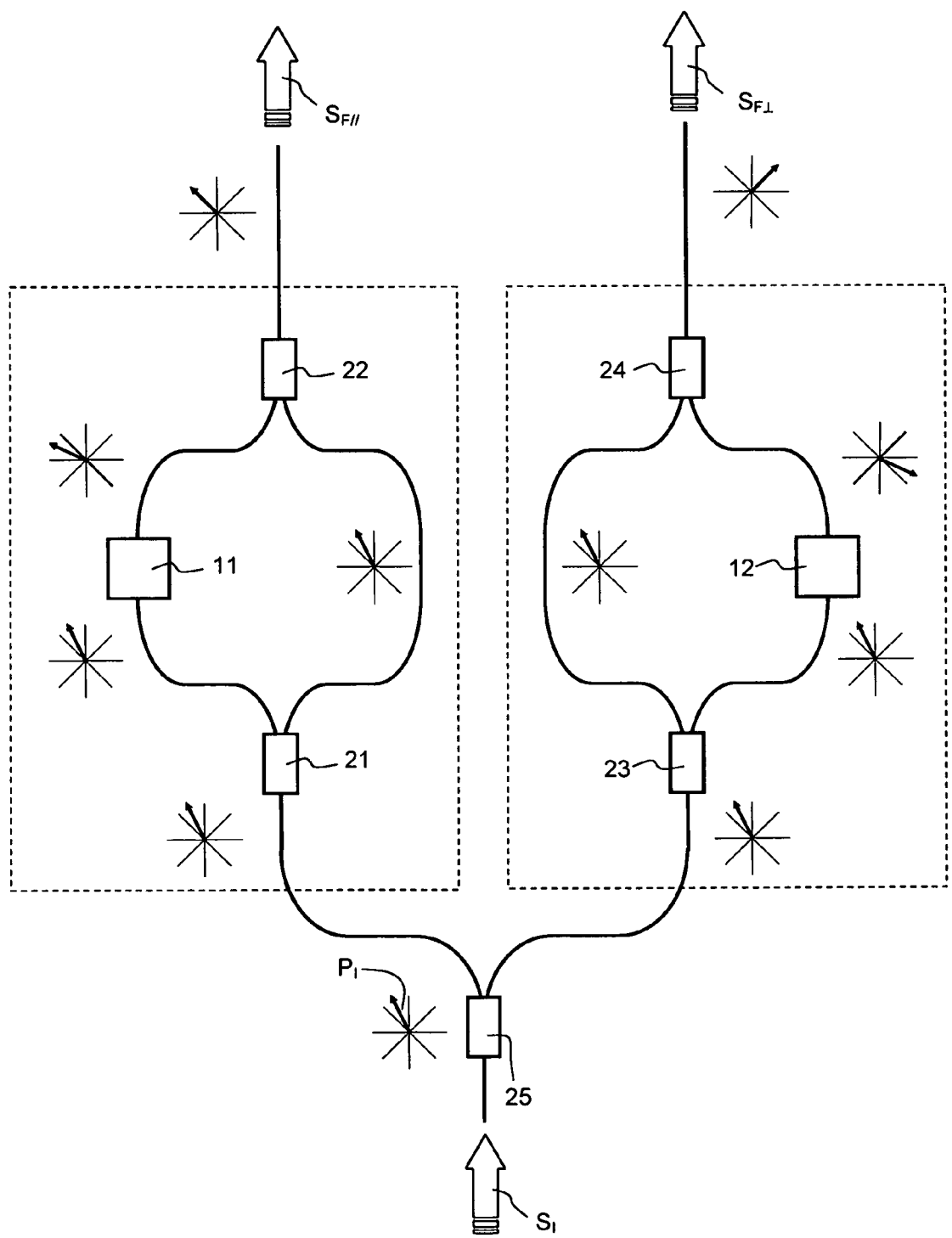
FIG. 3 represents the block diagram of a polarization splitting device according to the invention.

The device of FIG. 3 essentially comprises:

A first optical assembly as described above comprising a first rotator 11, a first coupler 21 and a second coupler 22. This assembly is enclosed by a dashed rectangle in FIG. 3;

A second optical assembly similar to the first assembly and comprising a second rotator 12, a third coupler 23 and a fourth coupler 24, the polarization axis of the second rotator 12 of this optical assembly being perpendicular to that of the first rotator 11. This assembly is also enclosed by a dashed rectangle in FIG. 3;

A fifth optical coupler 25 of the 1×2 type having one optical input and two optical outputs.

The optical assembly functions in the following way. Let there be an optical signal $S_I$ polarized in the direction $P_I$, for which the intensity of the input signal is $I_O$. The first coupler splits this signal into two signals $S_{F//}$ and $S_{F\perp}$ of intensity substantially equal $I_O/2$ and with the same polarization.

The first of these signals $S_{F//}$ travels through the first assembly. At the output of the first assembly, as seen above, the polarization plane of this first signal has the same direction as the polarization axis of the first rotator. If the polarization state of the signal makes an angle α with the polarization axis of the first rotator 11, the intensity of the input signal being equal to $I_O/2$, then, assuming all the optical components to be perfect, the intensity of the first output signal $S_{F//}$ is equal to $I_O \cdot [\cos^2\alpha]/2$.

The second of these signals passes through the second assembly. At the output of the second assembly, the polarization plane of this second signal $S_{F\perp}$ has the same direction as the polarization axis of the second rotator 12. The polarization axis of the second rotator is perpendicular to that of the first rotator. Consequently, the intensity of the input signal being equal to $I_O/2$, assuming all the optical components to be perfect, the intensity of the first output signal is equal to $$I_O \cdot \left[\cos^2\left(\alpha + \frac{\pi}{2}\right)\right]/2, \text{ i.e. } I_O \cdot \lfloor\sin^2\alpha\rfloor/2.$$

Since the polarization state of the first signal $S_{F//}$ coming from the first assembly is orthogonal to the second signal $S_{F\perp}$ coming from the second assembly, the polarization splitter function is thus fulfilled.

The total length of a device of this type, taking into account the curvature constraints for the waveguides connecting the various couplers, is typically of the order of 150 microns.

To simplify the technological production of the devices according to the invention, it is beneficial to use a maximum number of rotators having identical or symmetrical polarization axes. This reduces the handling operations during the production steps.

In order to recover a signal with a higher amplitude, it is possible to add an amplifier at the output of each branch of the aforementioned device. For example, this amplifier may be a semiconductor optical amplifier also abbreviated to SOA, or an erbium doped fibre amplifier also abbreviated to EDFA. In this case, the polarization the state of the final signal is adjusted so as to optimize the operation of these amplifiers.

What is claimed is:

1. A device for polarizing optical signals comprising at least a first optical assembly comprising:
   a polarization rotator having a polarization axis and arranged so that, from an input optical signal $S_I$ polarized linearly in a given direction $P_I$, it provides an output optical signal $S_F$ polarized linearly in a direction $P_F$ which is symmetrical to the polarization direction of the input signal with respect to the said polarization axis;
   a first optical coupler of the 1×2 type having one optical input and two optical outputs;
   a second optical coupler of the 2×1 type having two optical inputs and one optical output;
   the polarization rotator being arranged between the first output of the first coupler and the first input of the second coupler, the second output of the first coupler being connected to the second input of the second coupler, the rotator being a photonic crystal having a plurality of substantially plane and mutually parallel layers of semiconductor material, the said layers having a series of mutually parallel identical notches which are inclined with respect to the average plane of the layers.

2. A polarizing device, comprising at least:
   a first optical assembly composed of a polarization rotator having a polarization axis and arranged so that, from an input optical signal $S_I$ polarized linearly in a given direction $P_I$, it provides an output optical signal $S_F$ polarized linearly in a direction $P_F$ which is symmetrical to the polarization direction of the input signal with respect to the said polarization axis;
   a first optical coupler of the 1×2 type having one optical input and two optical outputs;
   a second optical coupler of the 2×1 type having two optical inputs and one optical output;
   the polarization rotator being arranged between the first output of the first coupler and the first input of the second coupler, the second output of the first coupler being connected to the second input of the second coupler,
   a second optical assembly comprising a second rotator having a polarization axis and arranged so that, from an input optical signal $S_I$ polarized linearly in a given direction $P_I$, it provides an output optical signal $S_F$ polarized linearly in a direction $P_F$ which is symmetrical to the polarization direction of the input signal with respect to the said polarization axis, and
   a third and a fourth coupler, the polarization axis of the second rotator of this optical assembly being perpendicular to that of the first rotator, the polarization rotator being arranged between the first output of the third coupler and the first input of the fourth coupler, the second output of the third coupler being connected to the second input of the fourth coupler;
   a fifth optical coupler of the 1×2 type having one optical input and two optical outputs, connected respectively to the input of the first optical assembly and to the input of the second optical assembly.

3. The device according to claim 2, wherein the rotators are photonic crystals having a plurality of substantially plane and mutually parallel layers of semiconductor material, the said layers having a series of mutually parallel identical notches which are inclined with respect to the average plane of the layers.

* * * * *